United States Patent
Bancel et al.

(10) Patent No.: US 8,412,988 B2
(45) Date of Patent: Apr. 2, 2013

(54) FAULT INJECTION DETECTOR IN AN INTEGRATED CIRCUIT

(75) Inventors: Frédéric Bancel, Lamanon (FR); Nicolas Berard, Trets (FR)

(73) Assignee: STMicroelectronics (Rousset) SAS, Rousset (FR)

(*) Notice: Subject to any disclaimer, the term of this patent is extended or adjusted under 35 U.S.C. 154(b) by 312 days.

(21) Appl. No.: 12/846,166

(22) Filed: Jul. 29, 2010

(65) Prior Publication Data

US 2011/0029828 A1    Feb. 3, 2011

(30) Foreign Application Priority Data

Jul. 30, 2009    (FR) ...................................... 09 55349

(51) Int. Cl.
*G06F 11/00*    (2006.01)
(52) U.S. Cl. ........................ 714/724; 714/733
(58) Field of Classification Search .................. 714/724, 714/725, 726–729, 733, 734, 764, 768, 798, 714/799
See application file for complete search history.

(56) References Cited

U.S. PATENT DOCUMENTS

| | | | | |
|---|---|---|---|---|
| 5,305,467 A * | 4/1994 | Herndon et al. | | 455/524 |
| 7,747,936 B2 * | 6/2010 | Pistoulet | | 714/820 |
| 7,904,775 B2 * | 3/2011 | Bancel et al. | | 714/732 |
| 2005/0169076 A1 | 8/2005 | Bancel et al. | | |
| 2005/0172185 A1 | 8/2005 | Bancel et al. | | |
| 2005/0246600 A1 * | 11/2005 | Pistoulet | | 714/724 |
| 2008/0022174 A1 * | 1/2008 | Bancel et al. | | 714/726 |
| 2009/0164858 A1 * | 6/2009 | Bancel et al. | | 714/726 |
| 2010/0318885 A1 * | 12/2010 | Lisart et al. | | 714/805 |

OTHER PUBLICATIONS

French Search Report dated Jul. 2010 from corresponding French Application No. 09/55349.
Jaramillo K et al., *10 Tips for Successful Scan Design: Part One*; EDN Electrical Design News, Reed Business Information, Highlands Ranch, CO, vol. 45, No. 4, Feb. 17, 2000, pp. 67-73, 75 XP000966353.

* cited by examiner

*Primary Examiner* — Dieu-Minh Le
(74) *Attorney, Agent, or Firm* — Wolf, Greenfield & Sacks, P.C.

(57) ABSTRACT

A circuit for detecting a fault injection in an integrated circuit including: at least one logic block for performing a logic function of said integrated circuit; an isolation block coupled to receive a signal to be processed and an isolation enable signal indicating a functional phase and a detection phase of the logic block, the isolation block applying, during the functional phase, the signal to be processed to at least one input of the logic block, and during the detection phase, a constant value to the input of the logic block; and a detection block adapted to monitor, during the detection phase, the state of the output signal of the logic block, and to generate an alert signal in case of any change in the state of the output signal.

29 Claims, 4 Drawing Sheets

FAULT INJECTION DETECTOR IN AN INTEGRATED CIRCUIT

CROSS REFERENCE TO RELATED APPLICATIONS

This application claims the priority benefit of French patent application Ser. No. 09/55349, filed on Jul. 30, 2009, entitled "FAULT INJECTION DETECTOR IN AN INTEGRATED CIRCUIT," which is hereby incorporated by reference to the maximum extent allowable by law.

FIELD OF THE INVENTION

The present invention relates generally to electronic circuits and in particular to the detection of faults in the functioning of an integrated circuit.

BACKGROUND TO THE INVENTION

Integrated circuit chips may comprise circuits considered as sensitive in view of the data that they manipulate, for example encryption or authentication keys, signatures etc. Such information should remain secret, in other words it should not be communicated to third parties or non-authorized circuits.

A common technique for pirating information manipulated by an integrated circuit includes detecting zones of the circuit involved during the processing that uses the information. For this, the circuit is activated or otherwise placed in an operational environment, and data (for example an encrypted message) is inputted for processing by the circuit. During the processing, the surface of the circuit is swept by a laser to inject faults in the functioning of the circuit. The output of the circuit is analyzed in parallel to determine the zone (the physical location) of the circuit involved in the processing of the sensitive data. Once the zone or zones have been localized, the pirate concentrates attacks (by fault injection) on these zones to discover the secret information (the algorithm itself or the keys), for example, by an analysis of the outputs or by side channel attacks, for example by statistical analysis of the circuit's power consumption.

FIG. 1 illustrates schematically, in block form, an integrated circuit chip 100 comprising circuit blocks 102 and 104, which are sensitive in view of the security of the data they manipulate, for example storing encryption keys. A common attack includes powering-up the circuit, applying certain data signals at the circuit input pins, and then blindly scanning the chip with a laser beam, to disrupt its functioning. In particular, the impact points (symbolized by points 106 in FIG. 1) of the laser beam bring about a change in the state of a logic circuit which results in a modification of the output data of the circuit. By correlating the scanned regions with the data obtained, a pirate can locate the circuit portions which implement the functions manipulating the sensitive data, and then concentrate subsequent attacks on this zone in order to discover the manipulated secret data.

To defend against laser attacks, the integrated circuit 100 comprises detection circuits 108, for example distributed regularly across the surface of the circuit. As soon as one of these detection circuits is hit by a laser beam, a countermeasure is triggered. Such a counter measure generally includes interrupting the operation of the circuit, for example, by performing a reset to reactivate the circuit. A counter can also be incremented after each detected attack, such that the integrated circuit can be disabled definitively once a threshold has been reached, for example by blowing a fuse.

The fault detection circuits 108 may take different forms. They may perform a redundant calculation by two different paths, and verify that there is coherence between the obtained results. If one of the paths is subject to a laser attack, the detector detects a non-coherence between the results. Other detection circuits monitor a signal derived from a clock signal.

The objective of a laser scan is to obtain a map of sensitive zones (either because they manipulate secret data, or because they contain a detector), in order to then position fault injection attacks.

Assuming that the integrated circuit is equipped with a mechanism for definitively and irreversibly disabling the circuit, the higher the number of detectors across the surface of the circuit, the higher the number of units (circuits) which will be needed by a pirate in order to locate the sensitive zones. Thus, the interest to a pirate of "an attack" depends on the number of integrated circuits that will need to be sacrificed in order to discover the secrets. However, the higher the number of detectors 108, the larger the circuit and the smaller the effective surface area available of implementing the functions for which the circuit is intended.

There is thus a problem in improving the protection of chips from fault injection attacks, without increasing the chip area.

SUMMARY OF THE INVENTION

It is an aim of an embodiment of the present invention to at least partially address one or more problems of known detectors of laser attacks.

Another aim of an embodiment of the present invention is to propose a solution that increases the fault detection capacity of a circuit without significantly increasing its surface area.

According to one aspect of the present invention, there is provided a circuit for detecting a fault injection in an integrated circuit comprising: at least one logic block for performing a logic function of said integrated circuit; an isolation block coupled to receive a signal to be processed and an isolation enable signal indicating a functional phase and a detection phase of the logic block, the isolation block applying, during said functional phase, said signal to be processed to at least one input of the logic block, and during said detection phase, a constant value to said input of the logic block; and a detection block adapted to monitor, during said detection phase, the state of said output signal of the logic block, and to generate an alert signal in case of any change in the state of the output signal.

According to another embodiment, the isolation block is adapted to receive a clock signal, and to apply, during said functional phase, said clock signal to at least one flip-flop, and during said detection phase, a constant value to said at least one flip-flop.

According to another embodiment, the circuit further comprises a bypass circuit adapted to couple, during said functional phase, an output of said flip-flop to said input of the logic block, and during said detection phase, an input of said flip-flop to said input of the logic block.

According to another embodiment, the circuit further comprises at least one delay element coupled to an output of said flip-flop; and a comparator adapted to compare the output of said at least one delay element and the output of said flip-flop to detect a change in the output signal of the flip-flop.

According to another embodiment, the isolation block is adapted to receive a control signal for controlling a plurality of elements of the logic block, the isolation signal being adapted to apply, during the functional phase, said control signals to control inputs of said plurality of elements, and to apply, during said detection phase, a logic low signal to a control input of at least one of said elements and a logic high signal to a control input of at least another one of said elements.

According to another embodiment, the isolation block comprises first and second multiplexers each having a first input coupled to receive said control signal, a second input of the first multiplexer being coupled to receive a logic high signal, and a second input of the second multiplexer being coupled to receive a logic low signal.

According to another embodiment, the isolation block comprises a multiplexer having data inputs coupled to receive the data signal and the constant value respectively, and a control input coupled to receive the control signal.

According to another embodiment, the logic block is a register associated with an address comprising a plurality of bits, and wherein said isolation block is adapted to receive an address signal, and to supply, during said functional phase, said address signal to first and second address inputs of said register, and during said detection phase, logic low address bits to said first address input and logic high address bits to said second address input.

According to another embodiment, the logic block is one of: a data encryption block; a cyclic redundancy check (CRC) block; a communications interface; a memory interface; a cryptographic processor; and a timer.

According to another embodiment, the isolation enable signal is a bit indicating when said logic block is being used for is functional purpose.

According to another embodiment, the output of said logic block is coupled to the input of at least one flip-flop, the output of the flip-flop being coupled to a second detection block adapted to detect, during said detection phase, a change in the output signal of the logic block, and wherein the flip-flop is adapted to be reset during said detection phase.

According to another aspect of the present invention, there is provided an integrated circuit comprising the above circuit.

According to yet another aspect of the present invention, there is provided an electronic device or an integrated circuit card comprising the above integrated circuit.

According to yet another aspect of the present invention, there is provided a method of detecting a fault attack in an integrated circuit comprising: receiving, by an isolation block, a data signal and an isolation enable signal indicating a functional phase and a fault detection phase of a logic block; during the functional phase, applying by the isolation block said data signal to at least one input of the logic block; during the detection phase, applying by the isolation block a constant value to the at least one input of the logic block; and monitoring, during the fault detection phase, the state of the output signal of the logic block, and generating an alert signal if there is any change in the state of the output signal.

BRIEF DESCRIPTION OF THE DRAWINGS

The foregoing and other purposes, features, aspects, and advantages of the invention will become apparent from the following detailed description of embodiments, given by way of illustration and not limitation with reference to the accompanying drawings, in which.

Throughout the drawings, like features have been labelled with like reference numerals.

DETAILED DESCRIPTION

For clarity, only those steps and elements useful for an understanding of the invention have been illustrated and will be described. In particular, the means for disabling an integrated circuit following the detection of a laser injected fault have not been explained in detail, the invention being compatible with all usual means of deactivation. Furthermore, the primary functions executed by the integrated circuit, such as encryption, signature calculation, data authentication, etc., have not been described in detail, the invention also being compatible with all functions that are to be protected against potential fault injection attacks.

Figure 2:
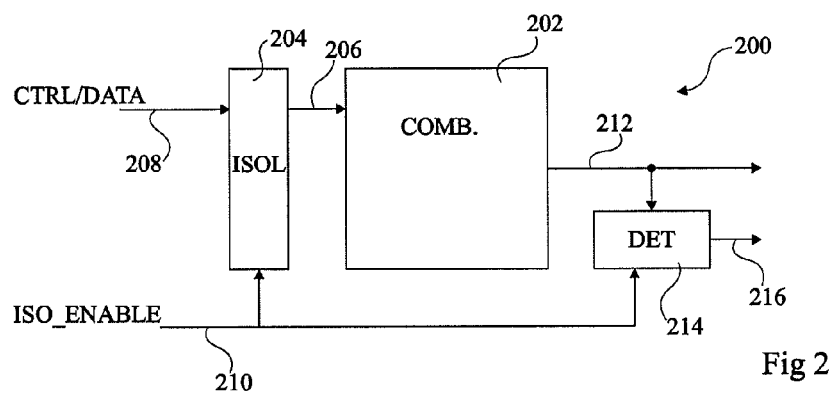
FIG. 2 is a block diagram showing a fault detection circuit according to an embodiment of the present invention.

FIG. 2 is a block diagram of a fault detection circuit 200 comprising a combinational logic block (COMB) 202. When activated for normal use, the logic block 202 performs its standard logic function, or primary function. Herein, this will be referred to as the "functional phase" of the logic block. For example, the logic block 202 could be part of a circuit for data encryption or for performing cyclic redundancy checks (CRC). Alternatively, the combinational logic block 202 could be part of a communications or memory interface, of a cryptographic processor, a timer or any other type of circuit.

For certain periods, generally for reducing power consumption of the integrated circuit, logic block 202 can be "parked", meaning that its normal function is not used. For example, a memory interface can be parked in between read and write operations, or a CRC block can be parked when no input data is to be processed.

It is proposed to use the periods during which the logic block 202 is parked, or more generally, the periods during which the logic block is not otherwise used, for making use of it as a fault detector. These periods will be referred to as a "fault detection phase" of the logic block.

One or more inputs of logic block 202 are coupled by lines 206 to one or more outputs of an isolation block 204 (ISOL). The isolation block 204 receives control (CTRL) and/or data (DATA) signals at one or more inputs 208, and comprises a control input coupled to a line 210 for receiving an isolation enable signal ISO_ENABLE. The isolation enable signal indicates the phase of the logic block 202, in other words whether it is in use or "parked". Based on the state of this signal, the isolation block 204 provides the control and/or data signals from inputs 208 to the inputs 206 of logic block 202, or provides constant logic values of given values, as will be described in more detail below. The logic block 202 comprises an output 212, providing the result of the logic function. This output 212 is coupled to other functions (not illustrated) of the integrated circuit depending on the intended destination of the processed data, for example, to other logic blocks, an input/output interface, a memory, etc. A detection block (DET) 214 is coupled to the output 212, and comprises a control input coupled to the line 210 for receiving the isolation enable signal ISO_ENABLE. During the fault detection phase, the detection block 214 provides, on an output line 216, a signal indicating the result of the detection, in other words any change in state when a fault is detected.

During the functional phase, when the isolation enable signal is not activated, for example when it is at a logic low, the detection block 214 is deactivated, and the input signals of the isolation block 204 are provided to logic block 202. The signal provided at the output 212 of the logic block corresponds thus to the result of the combinational logic function 202.

When the isolation enable signal is activated, for example when it is at a logic high, the isolation block 204 applies constant logic values to the inputs 206 of the logic block 202. For example, these constant values are chosen so as to propagate, to a maximum extent, through the logic block 202, in other words to result in maximum state changes in the logic gates of this block. This improves the sensitivity of the logic block to the detection of laser fault injections. Indeed, if the output state of a logic gate of the logic block 202 does not affect the output state provided by the logic block on line 212, a laser perturbation occurring at that logic gate would have no effect, and thus be non-detectable.

While activated by the signal ISO_ENABLE, the detection block 214 monitors the output signal of the logic block 202 in order to detect any change from an expected value. If, during a laser attack, the laser beam hits one of the gates (one of the transistors forming a logic gate) of logic block 202, the value at the output 212 is very likely to change, which allows detection block 214 to detect an attack. The state expected by the block 214 may be stored within the block 214, or be provided to an additional input terminal of this block. This expected state could equally be obtained by combining the signal ISO_ENABLE with other states.

The output signal of the detector 214 is used to implement a usual counter-measure, for example to immediately disable the integrated circuit, disable it after a time delay or after a certain number of attacks have been detected, etc.

Figure 3A:
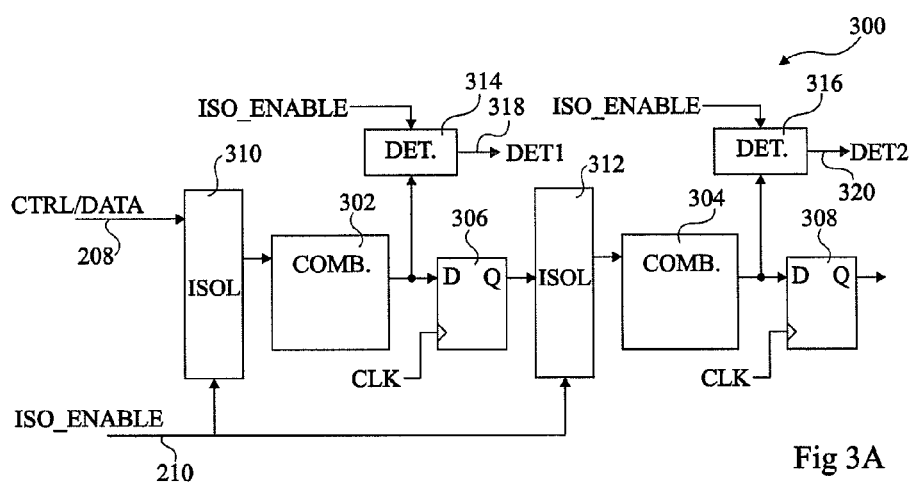
FIG. 3A is a block diagram of a fault detection circuit according to another embodiment of the present invention.

FIG. 3A illustrates an alternative embodiment of a fault detection circuit 300.

Circuit 300 comprises combinational logic blocks 302 and 304 (COMB), each block for example being of the same type as block 202 of FIG. 2.

The logic blocks 302, 304 are coupled in series, in other words with the output of logic block 302 being coupled to the input of block 304. The block 304 could, in some cases, comprise other inputs (not illustrated) originating from other parts of the circuit. The output of each block 302, 304 is synchronized by respective flip-flops 306 and 308. In this embodiment, isolation blocks 310 and 312 are provided respectively at the inputs of block 302 and 304, for isolating the control inputs (CTRL) and data inputs (DATA) of block 302 or 304. In some embodiments, the blocks 310, 312 could also isolate the timing signal, generally a clock signal CLK, of the corresponding flip-flops 306, 308.

The output of each logic block 302, 304 is coupled to a respective detection block 314, 316. The detection blocks 314, 316 also receive the isolation enable signal, and provide detection signals DET1 and DET2 on respective outputs 318 and 320. The logic state of the output 318 or 320 provides the result of the attack detection for the block 302 or 304.

The role of the isolation blocks is to stabilize the logic blocks, in other words such that their respective inputs no longer vary, meaning that it is possible to anticipate, and provide to, and/or store in the corresponding detection circuit 314 or 316, the expected output state.

Figure 3B:
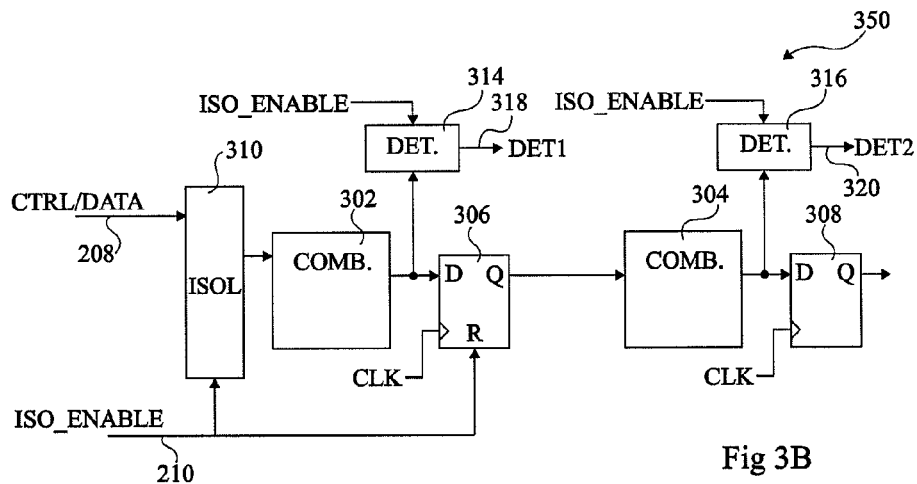
FIG. 3B is a block diagram of a fault detection circuit according to another embodiment of the present invention.

FIG. 3B illustrates an alternative 350 of the fault detection circuit of FIG. 3A. The circuit 350 does not comprise the isolation block 312, the output of flip-flop 306 being connected directly to the logic block 304. The flip-flop 306 comprises a reset input, which receives the isolation enable signal on line 210.

While the isolation enable signal in activated, for example it is at a logic high, the flip-flop 306 is reset, and the output is thus at a known logic level, for example at a logic low. The output level of logic block 304 is thus equally known, and any change in the output signal resulting from an attack against the flip-flop 306 or the logic block 304 can be detected by the detection block 316.

Figure 4:
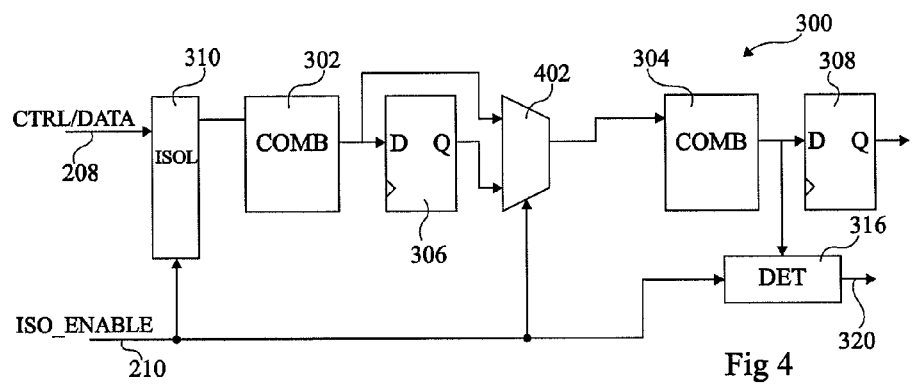
FIG. 4 is a block diagram of a fault detection circuit according to yet another embodiment of the present invention.

FIG. 4 illustrates a variation of the fault detection circuit 300 of FIG. 3A in which the flip-flop 306 no longer receives the clock signal during the detection phase. This can correspond, for example, to the case in which a deactivation of the primary function, such as entering a parked state, deactivates the clock signal. A two-input multiplexer 402 is thus coupled via its first input and output between the output of flip-flop 306 and the data/control input of isolation block 304. The isolation block 312 of FIG. 3A is removed. Multiplexer 402 also receives, at its second input, the output of logic block 302, and is controlled by the isolation enable signal ISO_ENABLE. In this embodiment, there is just one detection block 316 that is shared by the whole chain and detects an attack against either of the logic blocks 302 or 304.

Multiplexer 402 allows the flip-flop 306 to be bypassed during the fault detection phase, when the isolation enable signal is activated. This means that, while the logic blocks 302, 304 are performing their normal function, the flip-flops 306, 308 synchronize their outputs, but when logic blocks 302, 304 are used for fault detection, the signals at the output of logic block 302 are propagated via multiplexer 402 to logic block 304. This allows a single detection block 316 to be used to detect a perturbation in the logic blocks 302 and 304. It would be equally possible to detect a perturbation in one of the flip-flops 306 and 308 by using a detection block adapted for such a detection, such as described in the U.S. patent application Ser. No. 12/121,957, which is hereby incorporated by reference to the maximum extent allowable by the law.

Figure 5:
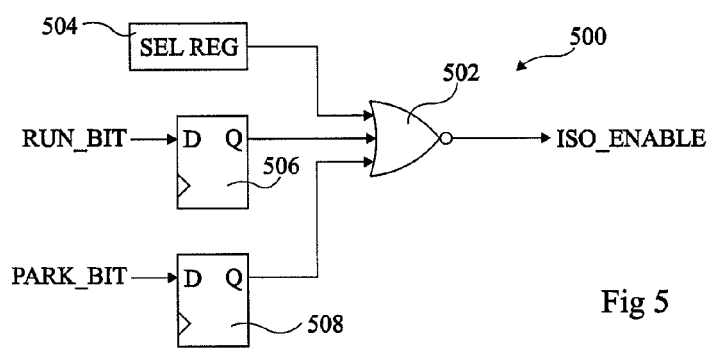
FIG. 5 illustrates a circuit for generating a detector enable signal according to an embodiment of the present invention.

FIG. 5 illustrates an example of a circuit 500 for generating the isolation enable signal ISO_ENABLE. Circuit 500 comprises a 3-input NOR gate 502, the inputs of which are respectively coupled to the output of a selection register 504, the output of a flip-flop 506 and the output of a further flip-flop 508. The selection register 504, for example, stores a 1-bit flag value indicating when one or more corresponding combinational logic blocks that receive the isolation enable signal are being used to perform their normal function. For example, assuming that the combinational logic blocks relate to a memory interface, the select register could store a read or write flag, indicating when a read or write operation is being performed in the memory.

The flip-flops 506 and 508 process control signals. For example, flip-flop 506 receives a run signal "RUN_BIT", indicating when the associated combinational logic block is activated, while flip-flop 508 receives a park signal "PARK_BIT", indicating when the associated combinational logic block is parked, and is not used for its normal function. Each of these signals is, for example, at a logic low when the corresponding logic blocks are not in use. Thus, the NOR gate 502 asserts the isolation enable signal when the three signals are at a logic low. The signal RUN_BIT corresponds, for example, to the enable signal of the fault detection function. In this case, this signal is active at a logic low.

Depending on the function of the logic block and the existence of a sleep or parked mode, the circuit for generating the isolation enable signal relies on all or some of the indicated signals, or other signals.

Figure 6:
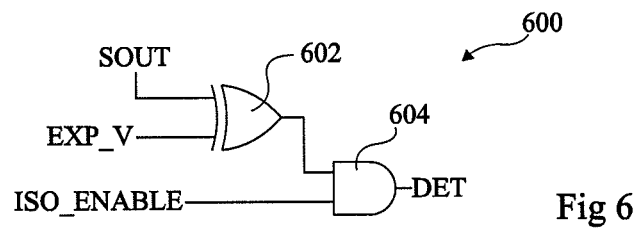
FIG. 6 illustrates an example of a fault detection block that could be used in the circuits of FIGS. 2 to 4.

FIG. 6 illustrates an example of a detection block 600, used for example in blocks 214, 314 or 316, for detecting a fault based on the output, labelled here as SOUT, of a corresponding combinational logic block. Depending on the constant input signals of the logic block applied by the isolation circuit, there will be an expected value EXP_V at the output SOUT.

The detection block 600 comprises a 2-input XOR gate 602, the inputs receiving the output SOUT of the logic block, and the expected value EXP_V of SOUT. If the states of these signals match, the output of XOR gate 602 will be at a logic low, whereas if they do not match, the output will be at logic high. The output of XOR gate 602 is coupled, for example, to one input of a 2-input AND gate 604, the other input of which receives the isolation enable signal ISO_ENABLE. In this example, a logic high of the isolation enable signal ISO_ENABLE signifies the activation of the fault detection and the gate 604 then provides an output at a logic high when a fault is detected. The detection signal DET at the output of the detection block 600 is, for example, used to disable the integrated circuit, or increment a counter.

Figure 7A:
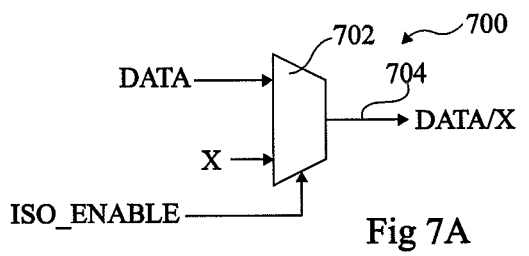
FIG. 7A shows in more detail an example of an isolation circuit of the circuits of FIGS. 2 to 4 for isolating a control signal.
Figure 7C:
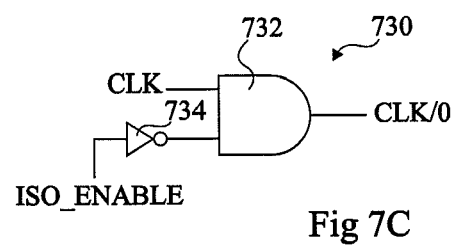
FIG. 7C shows in more detail an example of an isolation circuit of FIGS. 2 to 4 for isolating a clock signal.
Figure 7B:
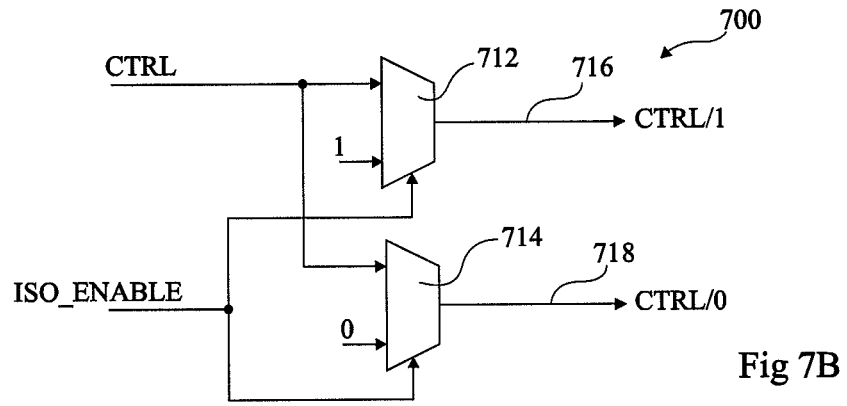
FIG. 7B shows an example of an isolation circuit of the circuits of FIGS. 2 to 4 for isolating a data input signal.

FIGS. 7A, 7B and 7C illustrate portions of the isolation blocks, for example blocks 204, 310 and 312 of FIGS. 2, 3 and 4, for processing data, control and clock signals respectively. For example, in the embodiment of FIG. 4, the isolation block 310 can isolate not only the data and control signals, but also the clock signal.

FIG. 7A illustrates a circuit 700 receiving a data signal DATA at one input of a 2-input multiplexer 702. The other input of multiplexer 702 receives a constant input value X, which is for example fixed at a logic value of "1" or "0". A control input of multiplexer 702 receives the isolation enable signal ISO_ENABLE.

The output 704 of multiplexer 702 provides either the data signal DATA when the corresponding logic block is performing its normal function, or the fixed value "X" when the corresponding logic block is used for fault detection.

FIG. 7B illustrates a circuit 710 receiving a control signal CTRL, which is provided at one input to each of a pair of 2-input multiplexers 712, 714. The second input to each of these multiplexers is respectively connected to a logic "1" and a logic "0", and their control inputs receive the isolation enable signal ISO_ENABLE.

In operation, the output 716 of multiplexer 712 provides the control signal CTRL when the corresponding logic block is performing its normal function, and a logic "1" when the corresponding logic block is used for fault detection. On the other hand, the output 718 of multiplexer 714 provides the control signal CTRL when the corresponding logic block is performing its normal function, and a logic "0" when the corresponding logic block is used for fault detection.

The outputs 716 and 718 are coupled to control nodes of the corresponding logic blocks (not illustrated). For example, some control signals may result in portions of the logic blocks being activated or deactivated. The choice between using output 716 or 718 for providing these control signals will depend on the state of the control signal that results in the activation of these elements of the logic block. Often, a same logic block will use both logic high and logic low control signals. Alternatively, the circuit 710 could provide only a high or low state.

FIG. 7C illustrates a circuit 730 receiving a clock signal CLK, which is provided to one input of a 2-input AND gate 732, the other input of which is provided by the output of an inverter 734, which inverts the isolation enable signal ISO_ENABLE. Thus, the AND gate 732 allows the clock signal to pass when the isolation enable signal is at a logic low, and provides a logic "0" when the isolation enable signal is at a logic high. In alternative embodiments, the circuit 730 could be arranged to provide a logic "1" when the isolation enable signal is high, for example by replacing AND gate 732 and inverter 734 by a NOR gate.

In the embodiments of FIGS. 3A and 4, a fault attack hitting the flip-flops 306 or 308 will not lead in itself to the detection of a fault, as these flip-flops are effectively disabled while the corresponding logic blocks are used for fault detection.

Figure 8:
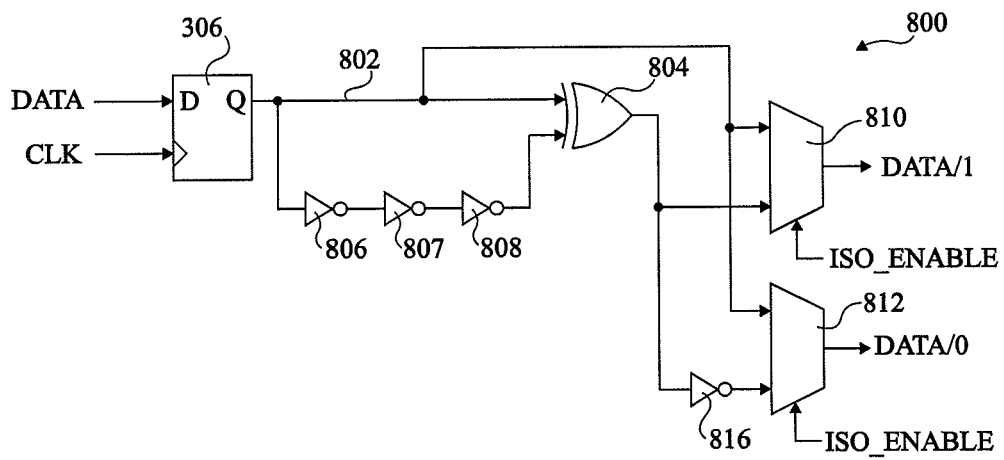
FIG. 8 illustrates an isolation circuit coupled to an output of a flip-flop according to an embodiment of the present invention.

FIG. 8 illustrates an example of the flip-flop 306 receiving a control signal CRTL or data signal DATA from a previous logic block, and being clocked by a clock signal CLK. The output 802 of flip-flop 306 is coupled to one input of a 2-input XOR gate 804, and also to the input of a first of three inverters 806 to 808 coupled in series, the output of the last inverter 808 being coupled to the second input to the XOR gate 804. Output 802 is also coupled to a first input of each of a pair of 2-input multiplexers 810 and 812. The second input of multiplexer 810 is coupled to the output of XOR gate 804, and the second input of multiplexer 812 is coupled to the output of XOR 804 via an inverter 816. Multiplexers 810 and 812 are controlled by the isolation enable signal ISO_ENABLE.

During the functional phase of the logic blocks coupled before and after the circuit 800, when the isolation enable signal is at a logic low, both multiplexers 810 and 812 output the data signal provided by flip-flop 306. When the corresponding logic blocks are used for fault detection, and the isolation enable signal is at a logic high, the clock signal CLK is frozen (by circuitry not illustrated), and the output of flip-flop 306 is fixed at a value of logic "0" or logic "1". While this output remains constant, the output of the XOR gate 804 will be high due to the inverters 806 to 808, which provide the inverted value, and the outputs of multiplexers 810 and 812 respectively provide a logic "1" and a logic "0".

However, if there is an attack against flip-flop 306, its output will change. This will not immediately result in a change at the output of inverter 808 due to the propagation delay in these inventers. Consequently, the output of XOR 804 will temporarily change state, thereby leading to the output of multiplexer 810 also temporarily changing state. Thus, the detection block coupled to either of the outputs of multiplexers 810 and 812 will detect the fault. In alternative embodiments, depending on the use made of the output signal of circuit 800, as single multiplexer could be used.

Figure 9:
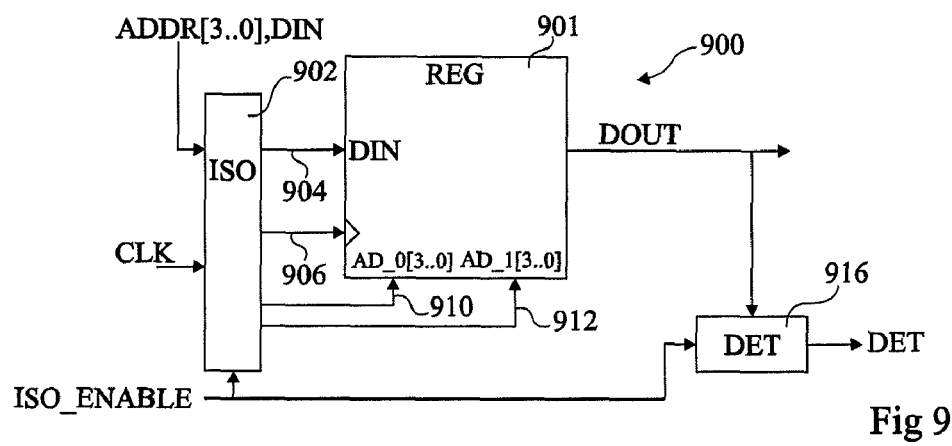
FIG. 9 illustrates an example of the structure of a register according to an embodiment of the present invention.

FIG. 9 illustrates a fault detection circuit 900 comprising a register 901, and an isolation block 902 controlled by the isolation enable signal ISO_ENABLE.

The isolation block 902 receives an address signal ADDR[3 . . . 0], the data signal DIN, and the clock signal CLK destined for the register. The isolation block receives the isolation enable signal, having the same value, for example, as a selection signal of the register 901. The isolation block processes the data signal DIN, and clock input CLK as described above in relation to FIGS. 7A to 7C, and provides the corresponding signals on lines 904 and 906 to the register 901.

However, the register comprises two address inputs 910 and 912, respectively receiving addresses AD_0[3 . . . 0] and AD_1[3 . . . 0]. When the register is performing its normal function and the isolation enable signal is at a logic low, the address ADDR[3 . . . 0] is provided, by block 902, on the two inputs 910, 912. When the register is to be used for fault detection, a 4-bit value "0000" is provided, by block 902, on line 910, and a 4-bit value "1111" is provided, by block 902, on line 912.

The register knows its own address. During the functional phase and detection phase, the register compares the bits of its own address that are at a logic "0" with the corresponding bits received on the input 910, and the bits of its own address that are at a logic "1" with the bits received on input 912. If they match, the address is considered as valid. Thus, during normal operation of the register, the address ADDR[3 . . . 0] will be considered as the valid address only if it corresponds to the address of the register. However, when the register is used as a fault detector, the address should always be considered as valid, except in the case of a fault.

As an example, assuming that the address of the register is "1010", to verify the address, the register verifies that AD_1[3]=1, AD_0[2]=0, AD_1[1]=1 and AD_0[0]=0.

Figure 1:
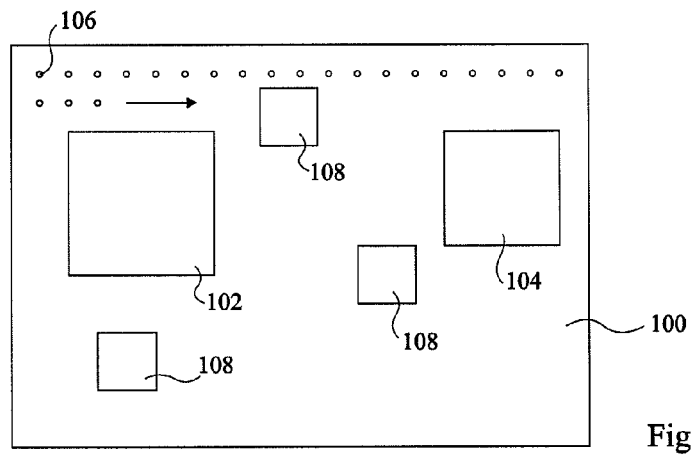
FIG. 1, described above, is aimed at demonstrating the state of the art and problem presented.
Figure 10:
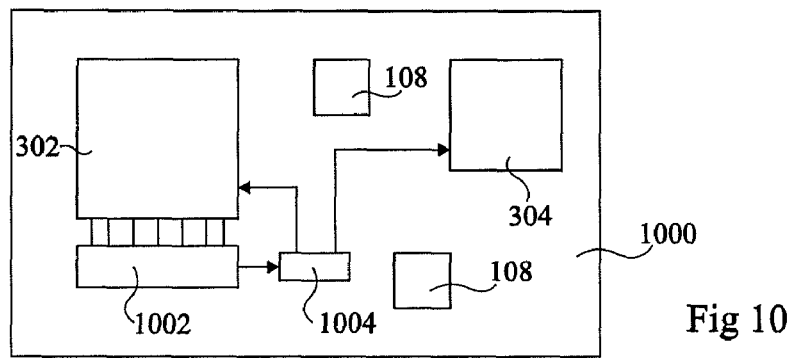
FIG. 10 is a block diagram of an integrated circuit according to an embodiment of the present invention.

FIG. 10 illustrates an integrated circuit 1000, which is similar to the integrated circuit 100 of FIG. 1, in that it comprises circuit blocks 302 and 304, which for example comprise sensitive portions. Additionally, circuit 1000 comprises a number of fault detection blocks 108, for detecting faults caused by laser attacks during a scan of the surface of the circuit. Additionally, the chip 1000 comprises a fault detection circuit 1002 coupled to the circuit block 302, for isolating the circuit block 302 for at least some of the time that it is not used for its normal function.

Upon detection of one or more fault attacks, a detection circuit 1004 disables the circuit block 302 and/or circuit block 304.

The integrated circuit 1000 forms, for example, part of an electronic device, such as an IC (integrated circuit) card, a video decoder, a mobile telephone, or other device.

In the embodiment of FIG. 10, only the circuit block 302 is isolated and used for fault detection. In alternative embodiments, other circuits such as the circuit block 304 may also be used for fault detection.

The embodiments described above allow an increase in the effective surface area of the integrated circuit that can be used to detect perturbations, at a cost of only a very small reduction in surface area available for the main functions.

Whilst a number of specific embodiments have been described, it will be apparent to those skilled in the art that there are numerous variations that could be applied.

For example, it has been described that the clock signal may be frozen during fault attack detection in some embodiments, but in other embodiments the clock signal may continue to be used, in the case that the outputs of the flip-flops are isolated.

Furthermore, while specific examples of signal values (logic "1" or logic "0") have been described for the isolation enable signal and other data and control signals during the detection of fault attacks, inverse signals could be used. Furthermore, while the embodiments describe the use of an output signal of each logic block in order to detect faults, more than one output signal, or even all of the output signals of a logic block, could be used for monitoring possible faults.

Furthermore, circuits other than those described by way of example could be envisaged in as much as they implement similar functions.

The various features and variants described in relation to the various embodiments could be combined in any combination.

What is claimed is:

1. A circuit for detecting a fault injection in an integrated circuit comprising:
   at least one logic block for performing a logic function of said integrated circuit;
   an isolation block coupled to receive a signal to be processed by the logic block and an isolation enable signal indicating a functional phase and a detection phase of the logic block, the isolation block applying, during said functional phase, said signal to be processed to at least one input of the logic block, and during said detection phase, applying a constant value to said input of the logic block; and
   a detection block adapted to monitor, during said detection phase, a state of an output signal of the logic block, and to generate an alert signal in case of any change in the state of the output signal.

2. The circuit of claim 1, wherein the isolation block is adapted to receive a clock signal, and to apply, during said functional phase, said clock signal to at least one flip-flop, and during said detection phase, a constant value to said flip-flop.

3. The circuit of claim 2, further comprising a bypass circuit adapted to couple, during said functional phase, an output of said flip-flop to said input of the logic block, and during said detection phase, an input of said flip-flop to said input of the logic block.

4. The circuit of claim 2, further comprising:
   at least one delay element coupled to an output of said flip-flop; and
   a comparator adapted to compare the output of said delay element and the output of said flip-flop to detect a change in the output signal of the flip-flop.

5. The circuit of claim 1, wherein the isolation block is adapted to receive control signals for controlling a plurality of elements of the logic block, the isolation signal being adapted to apply, during the functional phase, said control signals to control inputs of said plurality of elements, and to apply, during said detection phase, a logic low signal to a control input of at least one of said elements and a logic high signal to a control input of at least another one of said elements.

6. The circuit of claim 5, wherein said isolation block comprises first and second multiplexers each having a first input coupled to receive said control signal, a second input of the first multiplexer being coupled to receive a logic high signal, and a second input of the second multiplexer being coupled to receive a logic low signal.

7. The circuit of claim 1, wherein said isolation block comprises a multiplexer having data inputs coupled to receive a data signal and the constant value respectively, and a control input coupled to receive a control signal.

8. The circuit of claim 1, wherein the logic block includes a register associated with an address comprising a plurality of bits, and wherein said isolation block is adapted to receive an address signal, and to supply, during said functional phase, said address signal to first and second address inputs of said register, and during said detection phase, logic low address bits to said first address input and logic high address bits to said second address input.

9. The circuit of claim 1, wherein said logic block is one of:
   a data encryption block;
   a cyclic redundancy check block;
   a communications interface;
   a memory interface;
   a cryptographic processor; and
   a timer.

10. The circuit of claim 1, wherein the isolation enable signal is a bit indicating when said at least one logic block is being used for is functional purpose.

11. The circuit of claim 1, wherein the output of said at least one logic block is coupled to the input of at least one flip-flop, the output of the flip-flop being coupled to a second detection block adapted to detect, during said detection phase, a change in the output signal of the logic block, and wherein the flip-flop is adapted to be reset during said detection phase.

12. An integrated circuit comprising the circuit of claim 1.

13. An electronic device comprising the integrated circuit of claim 12.

14. An IC (integrated circuit) card comprising the integrated circuit of claim 12.

15. A method of detecting a fault attack in an integrated circuit, comprising:
   receiving, by an isolation block, a data signal and an isolation enable signal indicating a functional phase and a fault detection phase of a logic block;
   during the functional phase, applying by the isolation block said data signal to at least one input of the logic block;
   during the detection phase, applying by the isolation block a constant value to the at least one input of the logic block; and
   monitoring, during the fault detection phase, a state of an output signal of the logic block, and generating an alert signal if there is any change in the state of the output signal.

16. A circuit for detecting fault injection in an integrated circuit, comprising:
   a logic block configured to perform a logic function of the integrated circuit;
   an isolation block configured, in response to an isolation enable signal indicating a functional phase, to apply a signal to be processed to at least one input of the logic block and configured, in response to the isolation enable signal indicating a fault detection phase during which the logic block does not receive the signal to be processed, to apply a constant value to the at least one input of the logic block; and
   a detection block configured to monitor, during the fault detection phase, an output of the logic block and to generate a fault indication in response to a change in state of the output of the logic block.

17. A circuit for detecting fault injection as defined in claim 16, wherein the logic block includes at least one flip-flop, and wherein the isolation block is configured to apply a clock signal to the at least one flip-flop during the functional phase and to apply a constant value to the at least one flip-flop during the fault detection phase.

18. A circuit for detecting fault injection as defined in claim 16, wherein the logic block includes a flip-flop and a bypass circuit configured to couple an output of the flip-flop to an input of a further logic block during the functional phase and to couple an input of the flip-flop to the input of the further logic block during the fault detection phase.

19. A circuit for detecting fault injection as defined in claim 16, wherein the logic block includes a flip-flop and the isolation block includes a delay element coupled to an output of the flip-flop and a comparator configured to compare an output of the delay element and the output of the flip-flop to detect a change in the output signal of the flip-flop.

20. A circuit for detecting fault injection as defined in claim 16, wherein the isolation block is configured to apply a control signal to at least one control input of the logic block during the functional phase and to apply a constant value to the at least one control input of the logic block during the fault detection phase.

21. A circuit for detecting fault injection as defined in claim 20, wherein the isolation block includes first and second multiplexers each having a first input to receive the at least one control signal, a second input of the first multiplexer configured to receive a logic high signal, and a second input of the second multiplexer configured to receive a logic low signal.

22. A circuit for detecting fault injection as defined in claim 16, wherein the isolation block includes a multiplexer having a first data input configured to receive the signal to be processed, a second data input configured to receive the constant value, and a control input configured to receive the isolation enable signal.

23. A circuit for detecting fault injection as defined in claim 16, wherein the logic block includes a register associated with an address having a plurality of bits, and wherein the isolation block is configured to supply an address signal to first and second address inputs of the register during the functional phase and to supply logic low address bits to the first address input and logic high address bits to the second address input during the fault detection phase.

24. A circuit for detecting fault injection as defined in claim 16, wherein the output of the logic block is coupled to the input of at least one flip-flop, an output of the flip-flop being coupled to a second detection block configured to detect a change in the output of the logic block during the fault detection phase, and wherein the flip-flop is configured to be reset during the fault detection phase.

25. A method for detecting fault injection in an integrated circuit, comprising:
   applying, by an isolation block, a signal to be processed to at least one input of a logic block during a functional phase in which the logic block is used for its functional purpose;
   applying, by the logic block, a constant value to the at least one input of the logic block during a fault detection phase during which the logic block does not receive the signal to be processed; and
   monitoring, by a detection block, an output of the logic block during the fault detection phase and generating a fault indication in response to a change in state of the output of the logic block.

26. A method for detecting fault injection as defined in claim 25, wherein the logic block includes at least one flip-flop, further comprising applying, by the isolation block, a clock signal to the at least one flip-flop during the functional phase and applying a constant value to the at least one flip-flop during the fault detection phase.

27. A method for detecting fault injection as defined in claim 25, wherein the logic block includes a flip-flop, further comprising coupling an output of the flip-flop to an input of a further logic block during the functional phase and coupling an input of the flip-flop to the input of the further logic block during the fault detection phase.

28. A method for detecting fault injection as defined in claim 25, further comprising applying, by the isolation block, a control signal to at least one control input of the logic block during the functional phase and applying a constant value to the at least one control input of the logic block during the fault detection phase.

29. A method for detecting fault injection as defined in claim 25, wherein the logic block includes a register associated with an address having a plurality of bits, further comprising supplying, by the isolation block, an address signal to first and second address inputs of the register during the functional phase and supplying, by the isolation block, logic low address bits to the first address bit input and logic high address bits to the second address input during the fault detection phase.

* * * * *